United States Patent [19]
Sato

[11] Patent Number: 5,499,021
[45] Date of Patent: * Mar. 12, 1996

[54] PAGING RECEIVER WITH A DISPLAY FUNCTION THAT INHIBITS DISPLAY OF A RECEIVED COMMAND SIGNAL

[75] Inventor: Toshifumi Sato, Tokyo, Japan

[73] Assignee: NEC Corporation, Japan

[*] Notice: The portion of the term of this patent subsequent to Sep. 8, 2018, has been disclaimed.

[21] Appl. No.: 320,596

[22] Filed: Oct. 7, 1994

Related U.S. Application Data

[63] Continuation of Ser. No. 57,445, May 5, 1993, abandoned, which is a continuation of Ser. No. 588,040, Sep. 24, 1990, abandoned, which is a division of Ser. No. 242,063, Sep. 8, 1988, Pat. No. 4,959,644.

[30] Foreign Application Priority Data

Sep. 14, 1987 [JP] Japan ................................. 62-228276

[51] Int. Cl.$^6$ ..................................................... H04Q 7/14
[52] U.S. Cl. .................... 340/825.44; 340/311.1
[58] Field of Search .................. 340/825.44, 825.47, 340/825.48, 825.52, 311.1; 455/32.1, 38.4; 379/56, 57

[56] References Cited

U.S. PATENT DOCUMENTS

| | | | |
|---|---|---|---|
| 4,369,443 | 1/1983 | Giallanza et al. | 340/825.44 |
| 4,383,257 | 5/1983 | Giallanza et al. | 340/825.44 |
| 4,706,272 | 11/1987 | Nishimura et al. | 340/825.44 |
| 4,766,434 | 8/1988 | Matai et al. | 340/825.44 |
| 4,870,403 | 9/1989 | Mori et al. | 340/825.48 |
| 4,910,510 | 5/1990 | Davis et al. | 340/825.44 |
| 5,025,252 | 6/1991 | DeLuca et al. | 340/825.44 |

FOREIGN PATENT DOCUMENTS

| | | |
|---|---|---|
| 1227835 | 10/1987 | Canada . |
| 2154347 | 9/1985 | United Kingdom . |

*Primary Examiner*—Donald J. Yusko
*Assistant Examiner*—Edwin C. Holloway, III
*Attorney, Agent, or Firm*—Laff, Whitesel, Conte & Saret, Ltd.

[57] ABSTRACT

A paging receiver with a display function allows a conventional message to be displayed and a receiver control signal to be sent together in a single message format. A first and a second predetermined character are detected in a received message. A message occurring between the first and second characters is extracted as a receiver control signal and is not displayed on a display.

6 Claims, 6 Drawing Sheets

PAGING RECEIVER WITH A DISPLAY FUNCTION THAT INHIBITS DISPLAY OF A RECEIVED COMMAND SIGNAL

This is a continuation of application Ser. No. 08/057,445, filed May. 5, 1993 (now abandoned); which is a continuation of Ser. No. 07/588,040, filed Sep. 24, 1990 (now abandoned); which is a division of Ser. No. 07/242,063, filed Sep. 8, 1988, now U.S. Pat. No. 4,959,644.

BACKGROUND OF THE INVENTION

The present invention relates to a paging receiver with a display function which allows an ordinary message to be displayed and a receiver control signal to be transmitted and received together in the form of a single message.

With a prior art paging receiver having with a display function, it has been customary to separately send a conventional message to be displayed and a receiver control signal which is adapted for the registration and deletion of an address for the reception of information, alert control or similar purposes. That is, it has been impractical to send them together in a single message format. An example of a paging receiver of the kind described is disclosed in Japanese Laid-Open Patent Publication (Kokai) No. 62-289726 (corresponding to U.S. patent application Ser. No. 035,348 now U.S. Pat. No. 4,870,403, European Patent Application No. 87303013.4, Canadian Patent Application No. 584,391, Australian Patent Application No. 71377/87, Korean Patent Application No. 3486/1987, and Taiwan Patent Application No. 76101975).

The paging receiver disclosed in this Patent Publication is capable of receiving a call number assigned to that receiver (A call) and another call number adapted for an information service which is available for a number of unspecified receivers (B call). The receiver is allowed to or inhibited from receiving the information survice which is based on the B call to a group of unspecified receivers depending upon whether or not it detects a predetermined pattern (e.g. "space", "+" or "−") in a message which is added to the A call. More specifically, the receiver displays a message such as "OUT SERVICE" when the receiver is inhibited from receiving the information service and a message such as "IN SERVICE" when it is allowed to receive it.

As stated above, with a prior art paging receiver having a display function, it is impossible to send a receiver control signal and a conventional message in the form of a single composite message. For example, when a subscriber who owns the receiver is excluded from an information service, a message notifying the subscriber of the inhibition of reception of the information service such as "INFORMATION SERVICE XX NOT OFFERRED. FOR DETAILS, CALL XX-XXXX. X MONTH X DAY XX SERVICE CORP." cannot be sent together with a receiver control signal which disables the receiver from receiving the service. On the other hand, since a different pattern has to be pre-assigned to each receiver control function, it is difficult to provide the receiver with an extra control function after an information service has been initiated. For example, assume that only the receiver control function for "allowing and inhibiting the reception of an information service" is available with the receiver at the beginning of the service. Then, when an extra function of "energizing a speaker only when important information is supplied" is provided in addition to the above-mentioned receiver control function after the start of the service, the old version receiver fails to recognize a receiver control signal representative of the extra function and therefore erroneously displays it as an ordinary message.

SUMMARY OF THE INVENTION

It is therefore an object of the present invention to provide a paging receiver with a display function which allows an ordinary message to be displayed and a receiver control signal to be transmitted and received in the form of a single message.

It is another object of the present invention to provide a generally improved paging receiver with a display function.

A paging receiver with a display function of the present invention comprises a receiver section for receiving and demodulating a carrier wave which has been modulated by a paging signal and a message signal which follows the paging signal and contains a message, a decoder section for comparing the paging signal demodulated and a predetermined station's own paging signal which is assigned to the receiver. If the demodulated and station's own paging signals are coincident, outputting the message signal follows the paging signal. The paging receiver also includes a non-volatile memory storing the own station's paging signal and an operation mode of the receiver, an alert section for alerting a user of the receiver to reception of a call by the use of sound, light or similar means, a display section for displaying the message received, and a control section responsive to the message signal from the decoder section for controlling the alert section and causing the display section to display the message.

The control section is provided with message reception control means which comprise first comparing means for comparing a predetermined first character with the message contained in the message signal which is inputted from the decoder section, second comparing means for comparing the message received with a predetermined second character, and switch means for extracting the message received which appears from an instant when the first comparing means detects the first character in the received message to an instant when the second comparing means detects the second character in the received message. The message extracted by the message reception control means is treated as a receiver control signal and is not displayed by the display section.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
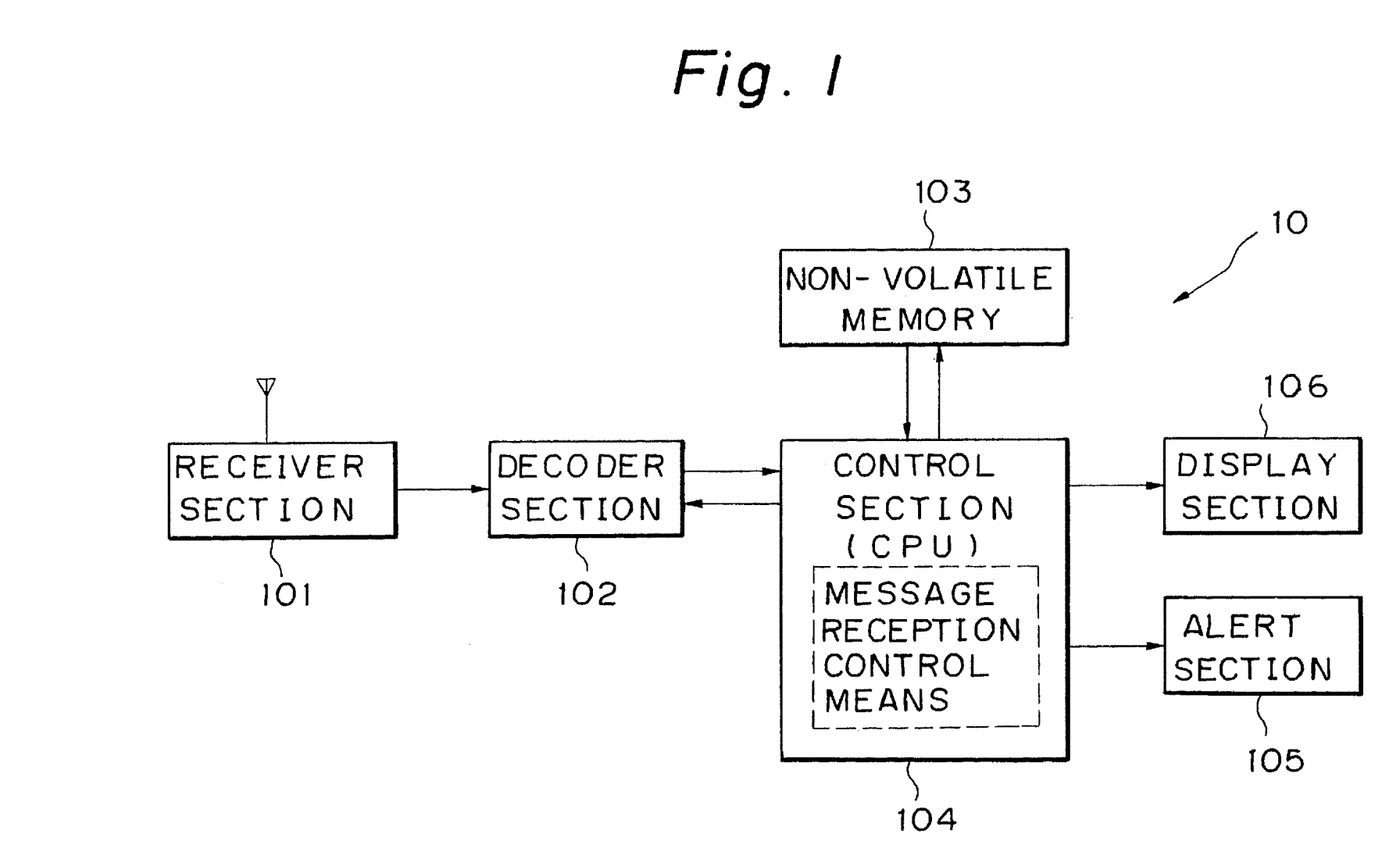
FIG. 1 is a schematic block diagram of a paging receiver with a display function embodying the present invention.

Referring to FIG. 1 of the drawings, a paging receiver with a display function embodying the present invention is shown and generally designated by the reference numeral 10. As shown, the paging receiver 10 is generally made up of a receiver section 101, a decoder section 102, a non-volatile memory 103, a control section 104, an alert section 105, and a display section 106. The receiver section 101 receives and demodulates a carrier wave which has been modulated by a paging signal and a message signal which follows the paging signal. The decoder section 102 compares the demodulated paging signal with its own predetermined station's own paging signal. When the demodulated paging signal is coincident with the control stations own paging signal the section 104 is activated while feeding the message signal to the control section 104. The non-volatile memory 103 stores therein the station's own paging number and an operation mode which is available with the receiver 10.

When a power switch, not shown, of the receiver 10 is turned on, the control section 104 reads the station's own paging number and the operation mode out of the memory 103 to load them in the decoder section 102. Upon the arrival of a message signal, the control section 104 energizes the alert section 105 while displaying the received message on the display section 106. The alert section 105 informs a person who owns the receiver of the arrival of a call by the use of sound, light or a similar alerting means.

Figure 2:
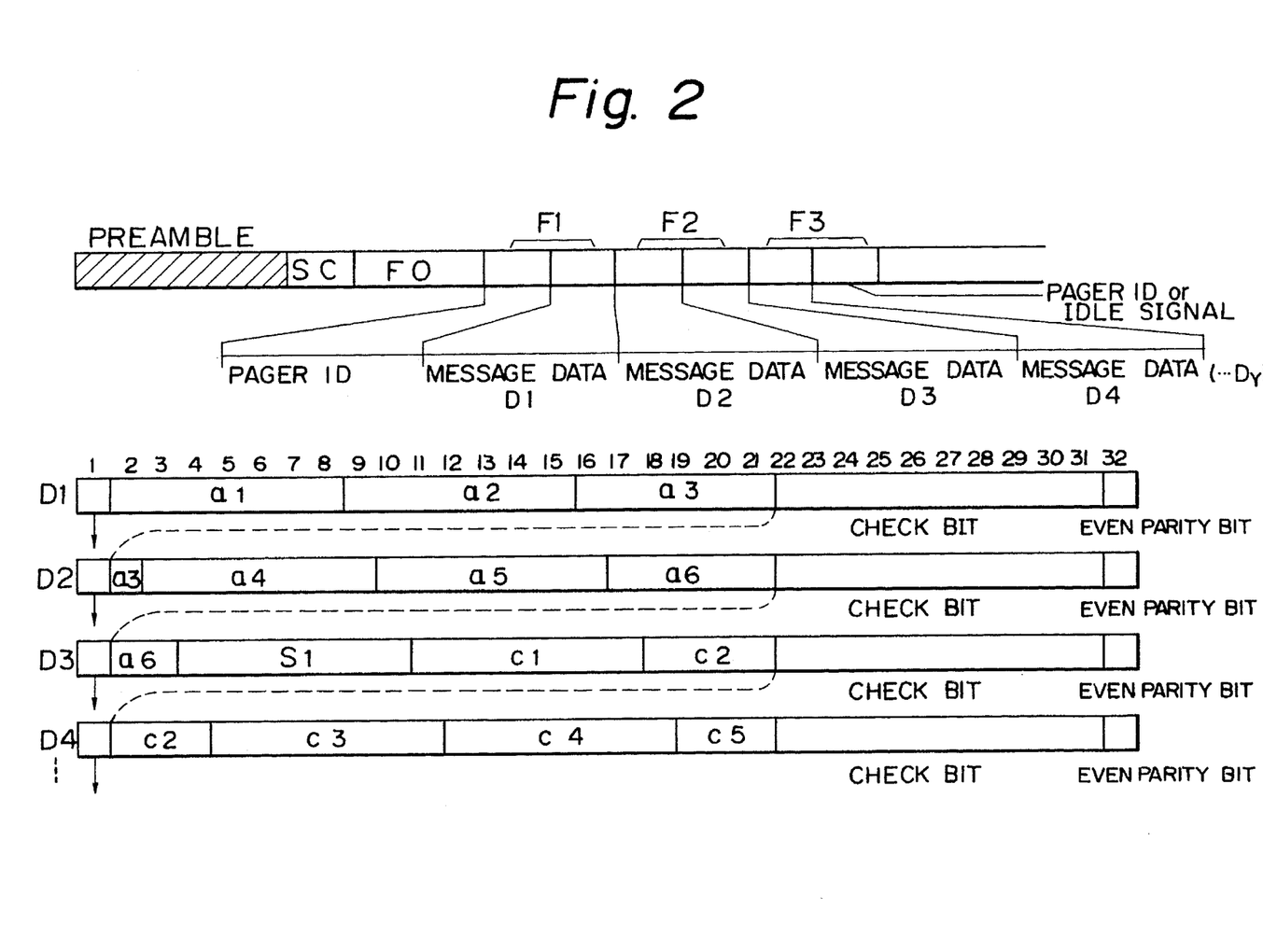
FIG. 2 shows a specific format of a paging signal applicable to the present invention (CCIR No. 1 code)
Figure 5:
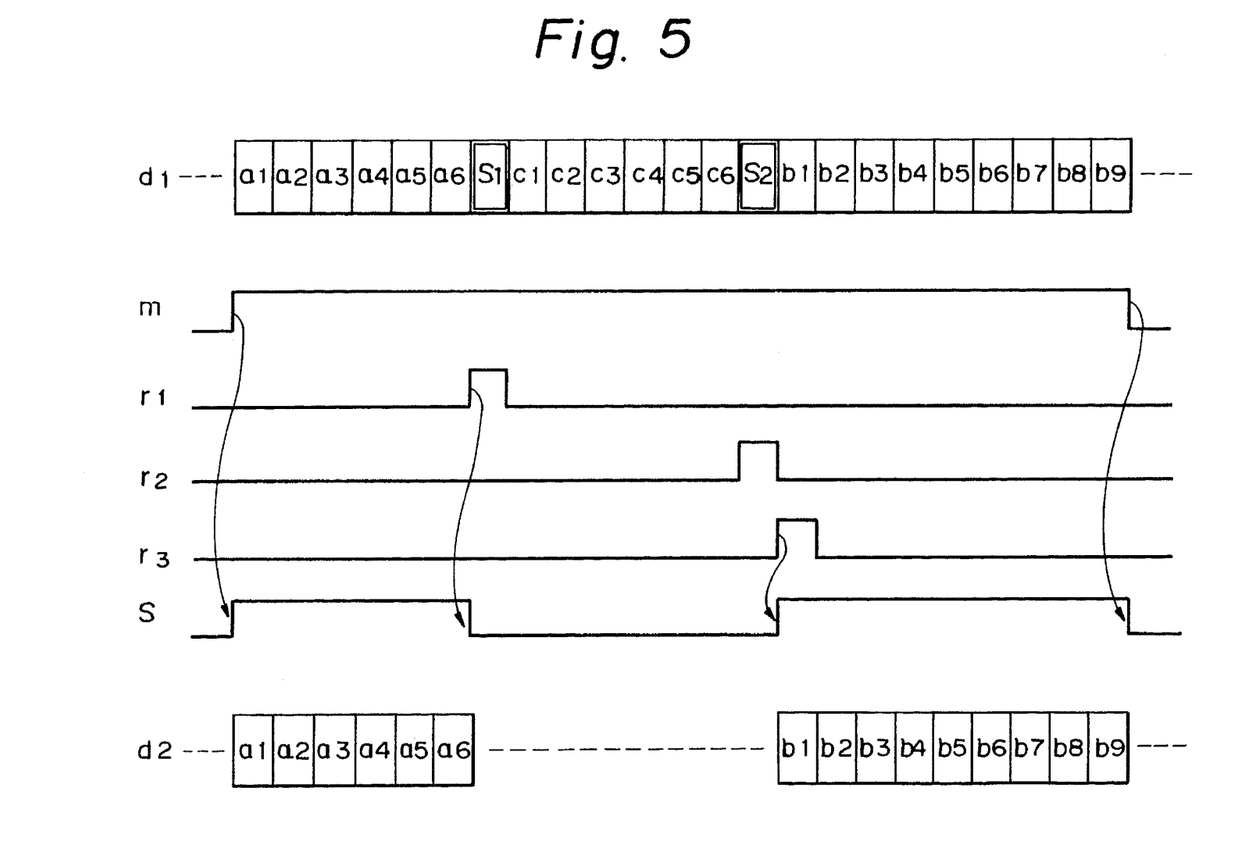
FIG. 5 is a timing chart which is useful for understanding the operation of the circuitry shown in FIGS. 3 and 4.

The paging signal applicable to the present invention may be implemented by the CCIR No. 1 code (POCSAG code). As shown in FIG. 2, messages $(a_1, a_2, a_3, \ldots, s_1, c_1, c_2, c_3, \ldots)$ are error-correction coded using a BCH code. Applying error control to the output of the receiver section 101, the decoder section 102 produces a message signal $d_1$ $(a_1, a_2, a_3, \ldots, s_1, C_1, C_2, C_3, \ldots)$, as shown in FIG. 5. The messages are implemented by alphanumeric characters which are standardized by ISO 646. Predetermined first and second characters S1 and S2 are usually selected from "control characters", i.e., those characters which are indicated in the first and second columns of Table 1 shown below.

TABLE 1

| Alpha-numeric Character-Set (Extracted from ISO 646) | | | | | | | | | |
|---|---|---|---|---|---|---|---|---|---|
| | | | | Bit No. 7 | | | | | |
| | | | 0 | 0 | 0 | 0 | 1 | 1 | 1 | 1 |
| | | | | | Bit No. 6 | | | | | |
| | | | 0 | 0 | 1 | 1 | 0 | 0 | 1 | 1 |
| | | | | | Bit No. 5 | | | | | |
| | | | 0 | 1 | 0 | 1 | 0 | 1 | 0 | 1 |
| Bit No. | | | | | | Column | | | | |
| 4 | 3 | 2 | 1 | Row | 0 | 1 | 2 | 3 | 4 | 5 | 6 | 7 |
| 0 | 0 | 0 | 0 | 0 | NUL | TC (DLE) | SP | 0 | @ | P | ` | p |
| 0 | 0 | 0 | 1 | 1 | TC (SOH) | DC | ! | 1 | A | Q | a | q |
| 0 | 0 | 1 | 0 | 2 | TC (STX) | DC | " | 2 | B | R | b | r |
| 0 | 0 | 1 | 1 | 3 | TC (ETX) | DC | £ (#) | 3 | C | S | c | s |
| 0 | 1 | 0 | 0 | 4 | TC (EOT) | DC | S (□) | 4 | D | T | d | t |
| 0 | 1 | 0 | 1 | 5 | TC (ENQ) | TC (NAK) | % | 5 | E | U | e | u |
| 0 | 1 | 1 | 0 | 6 | TC (ACK) | TC (SYN) | & | 6 | F | V | f | v |
| 0 | 1 | 1 | 1 | 7 | BEL | TC (ETB) | ' | 7 | G | W | g | w |
| 1 | 0 | 0 | 0 | 8 | FE (BS) | CAN | ( | 8 | H | X | h | x |
| 1 | 0 | 0 | 1 | 9 | FE (HT) | EM | ) | 9 | I | Y | i | y |
| 1 | 0 | 1 | 0 | 10 | FE (LF) | SUB | * | : | J | Z | j | z |
| 1 | 0 | 1 | 1 | 11 | FE (VT) | ESC | + | ; | K | [ | k | { |
| 1 | 1 | 0 | 0 | 12 | FE (FF) | IS (FS) | ' | < | L | \ | l | ¦ |
| 1 | 1 | 0 | 1 | 13 | FE (CFR) | IS (GS) | — | = | M | ] | m | } |
| 1 | 1 | 1 | 0 | 14 | SO | IS (RS) | . | > | N | ^ | n | - |
| 1 | 1 | 1 | 1 | 15 | SI | IS (US) | / | ? | O | - | o | DEL |

Figure 3:
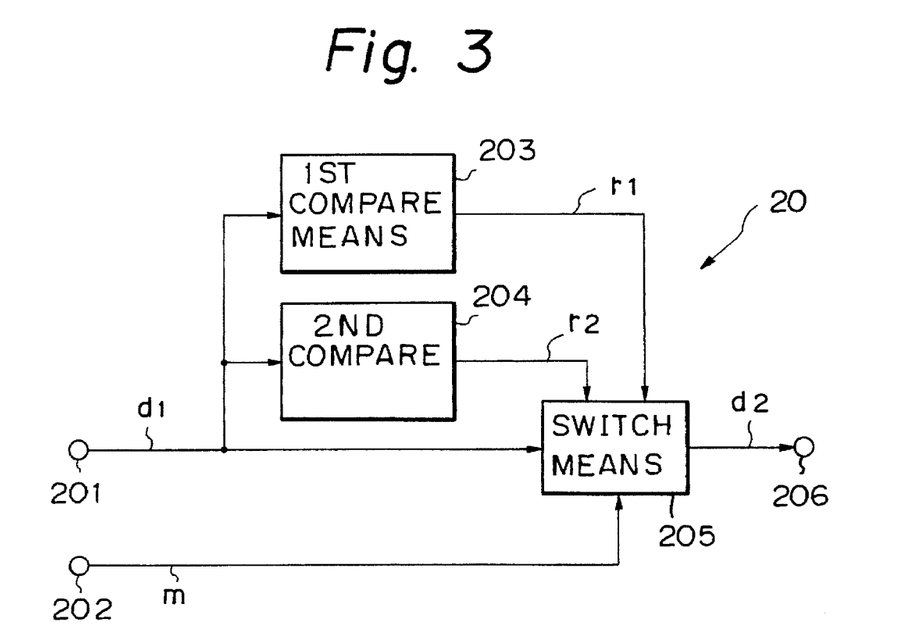
FIG. 3 is a block diagram schematically showing message reception control means which is included in the paging receiver of FIG. 1 and implemented by hardware.

FIG. 3 shows a specific construction of a message reception control means which is included in the control section 104 and is implemented by the disclosed hardware. The message reception control means, generally 20, includes an input terminal 201 allocated to the received message signal $d_1$ and an input terminal 202 allocated to a signal m which shows that the receiver 10 is receiving a message. First comparing means 203 compares the message signal $d_1$ with a predetermined first character $(s_1)$ If the message signal $d_1$ is coincident with the characters comparing means 203 a first character detect signal $r_1$. On the other hand, second comparing means 204 compares the message signal $d_1$ with a predetermined second character $(s_2)$ and, if they are coincident, outputs a second character detect signal $r_2$. Switch means 205 inhibits the input message signal $d_1$ from being fed to the display section 106 until the second character detect signal $r_2$ arrives at the switch means 205. The message signal $d_1$ is regarded as a receiver control signal. The output signal $d_2$ of the switch means 205 is fed out via an output terminal 206.

Figure 4:
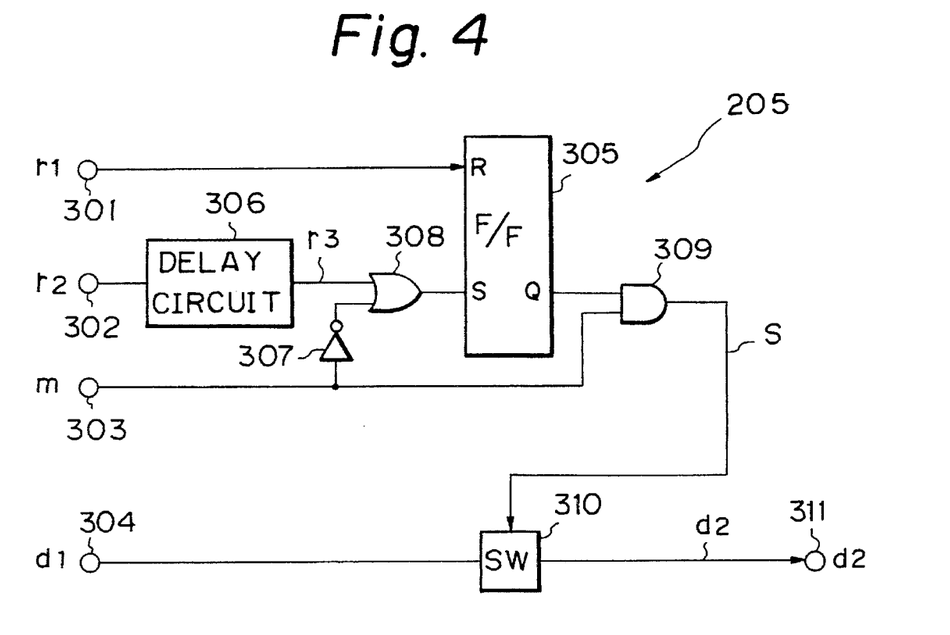
FIG. 4 is a schematic block diagram showing a specific construction of switch means is included in the message reception control means.

The switch means 205 of the message reception control means 20 is shown in detail in FIG. 4. In FIG. 4, the first character detect signal $r_1$ and the second character detect signal $r_2$ are applied to input terminals 301 and 302, respectively. The signal m used for the above-mentioned purpose is applied to an input terminal 303 while the received message signal $d_1$ is applied to an input terminal 304. The switch means 205 includes an SR flip-flop 305, a delay circuit 306 for delaying the second character detect signal $r_2$ by a period of time which is associated with one character to produce a delayed signal $r_3$, an inverter 307, an OR gate 308, an AND gate 309, and a switch 310 for outputting the received character signal $d_2$ only when the output of the AND gate 309, i.e., selection signal s is active. The received character signal $d_2$ is delivered to an output terminal 311.

The first character detect signal $r_1$ is fed to an R terminal of the SR flip-flop 305 while the second character detect signal $r_2$ is applied to the delay circuit 306 to become the delayed signal $r_3$ and then routed to the OR gate 308. The OR gate 308 ORs the delayed signal $r_3$ and the signal m which is applied thereto via the inverter 307, the resulting output of the OR gate 308 being fed to an S terminal of the flip-flop 305. The AND gate 309 produces AND of the output of the SR flip-flop 305 and the signal m to produce a section signal s which is active.

The operation of the above circuitry will be described with reference also made to FIG. 5. Assume that a sequence of received character signals $d_1$ have arrived. The character signal sequence $d_1$ includes a first character signal $s_1$ and a second character signal $s_2$ which are respectively representative of the beginning and the end of a receiver control command. The signal m remains active while the character signal sequence $d_1$ appears. The SR flip-flop 305 is held in a set condition when no message is received. Upon the start of the reception of a message, the signal m and therefore the selection signal s from the AND gate 309 becomes active. When the first comparing means 203 detects the first character signal $s_1$ in the signal sequence $d_1$, it produces the first character detect signal $r_1$. This signal $r_1$ resets the SR flip-flop 305 so that the selection signal s is made inactive. As a result, the switch 310 is turned off to prevent the signal sequence from advancing therethrough.

As soon as the second comparing means 204 detects the second character signal $s_2$ in the signal sequence $d_1$, it produces the second character detect signal $r_2$ and delivers it to the delay circuit 306. The output $r_3$ of the delay circuit 306 which has been delayed by one character in terms of time is fed to the SR flip-flop 305 to reset this flip-flop 305. Consequently, the selection signal s becomes active again to turn on the switch 310 so that the received character signal $d_2$ is outputted. When the message is fully received, the signal m and therefore the selection signal s becomes inactive to turn off the switch 310.

Figure 6:
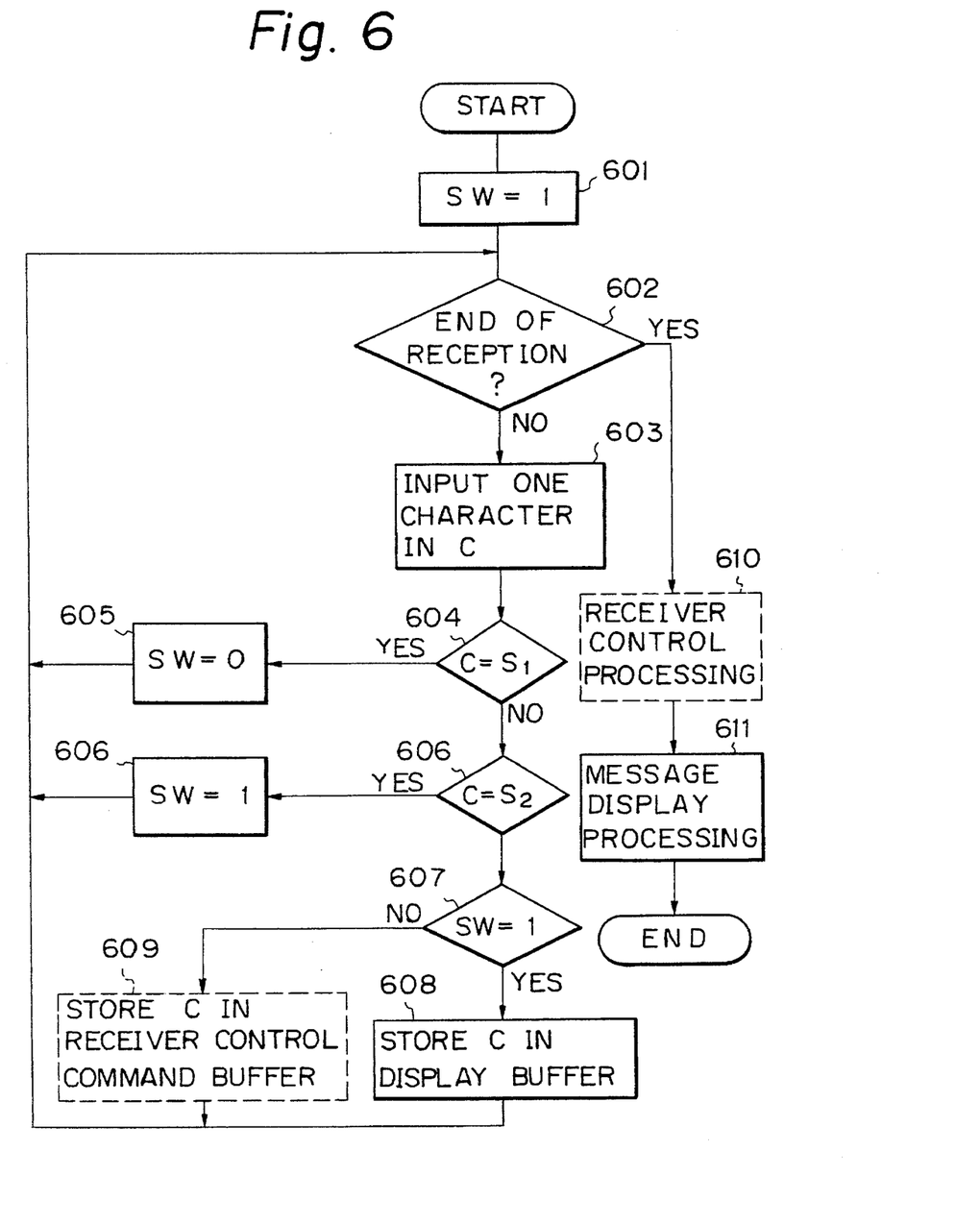
FIG. 6 is a flowchart demonstrating the operation of the message reception control means which is implemented by software.

Referring to FIG. 6, there is shown in a flowchart the operation of the message reception control means which is included in the control section 104 (FIG. 1) and is implemented by software. The procedure shown in FIG. 6 begins when a message is inputted from the decoder section 102 after the station's own address. The control means in section 104 initializes a switch flag SW to (logical) ONE in a step 601. In the subsequent step 602, the control means determines whether or not a message has ended and, if it has ended, executes receiver control processing (step 610) and message display processing (step 611). If the answer of the step 602 is NO, one character of the received message is inputted to be temporarily stored in a register C in a step 603 (The character stored in the register C will be referred to as the inputted character C). In a step 604, the inputted character C and the predetermined first character $s_1$ are compared and, if they are coincident, the switch flag SW is reset to (logical) ZERO in a step 605. Then, the inputted character C is compared with the predetermined second character $s_2$ in a step 606 and, if they are coincident, the switch flag SW is set to ONE in the step 606. The logical state of the switch flag SW is checked in a step 607. If the switch flag SW is ONE, the inputted character C is determined to be a part of a message which should be displayed and, in a step 608, stored in a display buffer. If the switch flag SW is ZERO, the character C is identified as constituting a part of a receiver control command and is stored in a receiver control command buffer (step 609). The message display processing performed in the step 611 is such that the message stored in the display buffer is read out and displayed on the display section 106. At the same time, the alert section 105 is driven to alert the user to the message.

Figure 7:
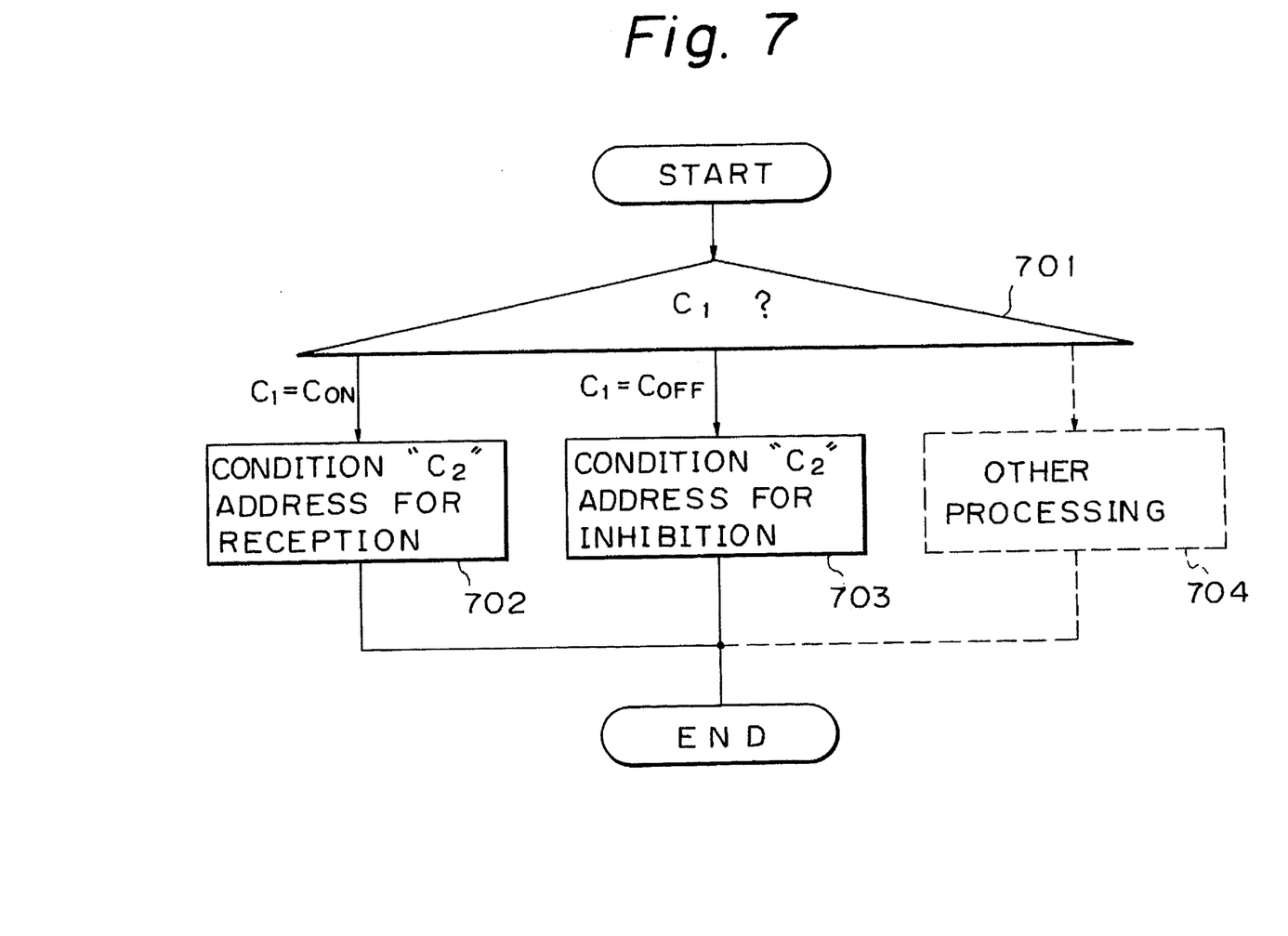
FIG. 7 is a flowchart representative of a specific receiver control procedure in accordance with the present invention.

A specific receiver control routine will be described with reference to FIG. 7. As shown, when the first character C1 of a receiver control command is a predetermined character $C_{on}$ as determined in a step 701, an address designated by the second character C2 is conditioned for reception (step 702). More specifically, an address reception sets a bit in the non-volatile memory 103 while, at the same time, the address is registered in the decoder section 102. In this condition, an information service may be received by using that particular address until an address reception inhibit command which will be described arrives. If the first character C1 of the receiver control command is a predetermined character $C_{011}$, an address designated by the second character C2 is conditioned for inhibition (step 703). More specifically, an address reception inhibit bit of the memory 103 is reset and the address in the decoder section 102 is deleted. Then, the receiver is inhibited from receiving the information service by using the address until the above-mentioned address reception allow command arrives. Characters other than $C_{on}$ and $C_{011}$ are reserved for use as the first character C1 in order to implement future addition of extra functions, step 704.

In summary, it will be seen that the present invention provides a paging receiver with a display function which allows a conventional message to be displayed and a receiver control signal to be sent together in a single message format, thereby effectively promoting various kinds of information services and facilitating future addition of extra functions.

Various modifications will become possible for those skilled in the art after receiving the teachings of the present disclosure without departing from the scope thereof.

What is claimed is:

1. A radio pager having a message displaying function, said pager comprising:

means for receiving a radio signal including a message signal transmitted from a base station, said receiving means having an output;

first detecting means having an input coupled to receive signals from said output of said receiving means, said first detecting means detecting a message identification signal included in said radio signal received from said base station, said message identification signal representing a beginning of said message signal, and said first detecting means outputting a message detection signal responsive to a detection of said received message identification signal;

second detecting means having an input coupled to receive signals from said first detecting means, said second detecting means detecting a first character signal included in said message, and detecting a second character signal included in said message and following said first character signal, said second detecting means outputting a first and a second character detection signal responsive to said detection of said first and second character signals, respectively; and first storing means for starting a storage of said message in response to said message detection signal, for interrupting storage of said message in response to said first character detection signal, and for resuming the storage of said message in response to said second character detection signal.

2. A pager as claimed in claim 1 further comprising message display means, message control means for causing a message displaying function on said message display means to display said message stored in said first storing means.

3. A pager as claimed in claim 1, further comprising:

extracting means for extracting a control signal which intervenes between said first and second character signals for setting an operation mode of said pager; and second storing means for storing said control signal extracted by said extracting means.

4. A pager as claimed in claim 2, wherein a plurality of address numbers are assigned to said pager, said pager further comprising first setting means responsive to said control signal stored in said second storing means for setting an active one of said plurality of address numbers which alerts a user of said pager when a predetermined address number assigned to said pager is received.

5. A pager as claimed in claim 4, further comprising:

a plurality of alerting means for alerting a user of said pager to an incoming call; and second setting means for setting, in response to said control signal stored in said second storing means, an active one of said plurality of alerting means which alerts the user when a predetermined address number assigned to said pager is received.

6. A pager as claimed in claim 5, further comprising third setting means for selectively activating or deactivating said receiving means in response to said control signal stored in said second storing means.

* * * * *